United States Patent
Christie (10) Patent No.: US 11,631,387 B2
(45) Date of Patent: Apr. 18, 2023

(54) DRUMSTICK

(71) Applicant: Scott Christie, Westphal (CA)

(72) Inventor: Scott Christie, Westphal (CA)

(*) Notice: Subject to any disclaimer, the term of this patent is extended or adjusted under 35 U.S.C. 154(b) by 0 days.

(21) Appl. No.: 17/335,117

(22) Filed: Jun. 1, 2021

(65) Prior Publication Data

US 2021/0383779 A1 Dec. 9, 2021

(30) Foreign Application Priority Data

Jun. 3, 2020 (CA) .................................. CA 3081894

(51) Int. Cl.
| | |
|---|---|
| *G06F 3/048* | (2013.01) |
| *G10D 13/12* | (2020.01) |
| *G01P 15/08* | (2006.01) |
| *G06F 3/039* | (2013.01) |

(52) U.S. Cl.
CPC .............. *G10D 13/12* (2020.02); *G01P 15/08* (2013.01); *G06F 3/0393* (2019.05); *G06F 3/048* (2013.01)

(58) Field of Classification Search
None
See application file for complete search history.

(56) References Cited

U.S. PATENT DOCUMENTS

| | | | | |
|---|---|---|---|---|
| 6,069,308 A | * | 5/2000 | Rabb ...................... | G10D 13/06 84/422.4 |
| 6,310,278 B1 | * | 10/2001 | Butler .................... | G10D 13/12 84/422.4 |
| 6,777,608 B1 | * | 8/2004 | Redding ................ | G10H 1/342 84/746 |
| 2005/0257671 A1 | * | 11/2005 | Aimi ...................... | G10H 3/146 84/735 |
| 2011/0030533 A1 | * | 2/2011 | Piccionelli ........... | G10H 1/0083 84/422.4 |
| 2012/0247308 A1 | * | 10/2012 | Tsai ....................... | G06F 3/0428 84/658 |
| 2016/0203807 A1 | * | 7/2016 | Hardi .................... | G10H 1/0083 84/600 |

FOREIGN PATENT DOCUMENTS

WO WO-2013016304 A1 * 1/2013 ............. G10H 1/342

* cited by examiner

*Primary Examiner* — Xuyang Xia
(74) *Attorney, Agent, or Firm* — Bonini IP Law, LLC; Frank J. Bonini, Jr.

(57) ABSTRACT

A drumstick is provided. The drumstick comprises a shaft. A plurality of sound initiating elements are disposed along the shaft. The sound initiating elements are adapted for initiating generation of sound associated with simultaneously activating a plurality of percussion surfaces of a percussion music instrument.

10 Claims, 5 Drawing Sheets

DRUMSTICK

FIELD OF THE INVENTION

The present invention relates to percussion music instruments, and more particularly to a drumstick adapted for enabling initiation of sound generation associated with simultaneously activating a plurality of percussion surfaces of a percussion music instrument.

BACKGROUND OF THE INVENTION

Percussion music instruments having a plurality of percussion surfaces such as, for example, marimba, xylophone, vibraphone, and MalletKat, are typically played using two drumsticks, one held in each hand, or by four drumsticks with two held in each hand.

Due to an increasing demand for novelty in sound, musicians are required to produce ever more unique sound effects. This is particularly true of percussion players who have traditionally been called upon to supply an array of novel sound effects for both live and recorded sound.

While the uniqueness of a particular performer resides to a large degree in his or her individual skill and technique, the fierce competition of the present-day music industry increasingly requires novel sound effects that can only be created using new devices, for example, by providing new music instruments, modifying existing music instruments, or providing new tools for playing existing music instruments.

It is desirable to provide a drumstick that is adapted for initiating generation of sound associated with simultaneously activating a plurality of percussion surfaces of a percussion music instrument.

It is also desirable to provide a drumstick that is adapted for enabling simultaneously activating a plurality of percussion surfaces of a percussion music instrument.

It is also desirable to provide a drumstick that is adapted for enabling simultaneously activating a plurality of percussion surfaces of a percussion music instrument such that the resulting sound forms a chord.

It is also desirable to provide a drumstick that is adapted for enabling simultaneously activating a plurality of percussion surfaces of a percussion music instrument such that different sound combinations can be created.

It is also desirable to provide a drumstick that comprises a plurality of activating elements disposed along a shaft thereof for enabling simultaneously activating a plurality of percussion surfaces of a percussion music instrument.

It is also desirable to provide a device for touching a touch sensitive surface that is adapted for simultaneously touching the touch sensitive surface at a plurality of locations with each location being associated with a predetermined unique event.

SUMMARY OF THE INVENTION

Accordingly, one object of the present invention is to provide a drumstick that is adapted for initiating generation of sound associated with simultaneously activating a plurality of percussion surfaces of a percussion music instrument.

Another object of the present invention is to provide a drumstick that is adapted for enabling simultaneously activating a plurality of percussion surfaces of a percussion music instrument.

Another object of the present invention is to provide a drumstick that is adapted for enabling simultaneously activating a plurality of percussion surfaces of a percussion music instrument such that the resulting sound forms a chord.

Another object of the present invention is to provide a drumstick that is adapted for enabling simultaneously activating a plurality of percussion surfaces of a percussion music instrument such that different sound combinations can be created.

Another object of the present invention is to provide a drumstick that comprises a plurality of activating elements disposed along a shaft thereof for enabling simultaneously activating a plurality of percussion surfaces of a percussion music instrument.

Another object of the present invention is to provide a device for touching a touch sensitive surface that is adapted for simultaneously touching the touch sensitive surface at a plurality of locations with each location being associated with a predetermined unique event.

According to one aspect of the present invention, there is provided a drumstick. The drumstick comprises a shaft. A plurality of sound initiating elements are disposed along the shaft. The sound initiating elements are adapted for initiating generation of sound associated with simultaneously activating a plurality of percussion surfaces of a percussion music instrument.

According to the aspect of the present invention, there is provided a drumstick. The drumstick comprises a shaft. A plurality of sound initiating elements are disposed along the shaft. The sound initiating elements are adapted for initiating generation of sound associated with simultaneously activating a plurality of percussion surfaces of a percussion music instrument. The sound initiating elements are placed such that they enable the initiation of the generation of sound associated with the activating of different combinations of the percussion surfaces. The sound initiating elements associated with the same combination of the percussion surfaces are disposed along a line parallel to a longitudinal axis of the shaft.

According to the aspect of the present invention, there is provided a drumstick. The drumstick comprises a shaft. A plurality of sound initiating elements are disposed along the shaft. The sound initiating elements are adapted for initiating generation of sound associated with simultaneously activating a plurality of percussion surfaces of a percussion music instrument. The sound initiating elements comprise accelerometers disposed in the shaft.

According to another aspect of the present invention, there is provided a device for touching a touch sensitive surface. The device comprises a shaft having a plurality of activating elements disposed therealong. The activating elements are adapted for simultaneously touching the touch sensitive surface at a plurality of locations with each location being associated with a predetermined unique event for generating an event combination associated with the simultaneous initiation of the events associated with the plurality of locations.

According to the other aspect of the present invention, there is provided a device for touching a touch sensitive surface. The device comprises a shaft having a plurality of activating elements disposed therealong. The activating elements are adapted for simultaneously touching the touch sensitive surface at a plurality of locations with each location being associated with a predetermined unique event for generating an event combination associated with the simultaneous initiation of the events associated with the plurality of locations. The activating elements are placed such that they enable the initiation of the generation of sound associated with the simultaneous initiation of the events with the locations corresponding to locations on a user interacting surface of a music instrument displayed on the touch sensitive surface.

The advantage of the present invention is that it provides a drumstick that is adapted for initiating generation of sound associated with simultaneously activating a plurality of percussion surfaces of a percussion music instrument.

A further advantage of the present invention is that it provides a drumstick that is adapted for enabling simultaneously activating a plurality of percussion surfaces of a percussion music instrument.

A further advantage of the present invention is that it provides a drumstick that is adapted for enabling simultaneously activating a plurality of percussion surfaces of a percussion music instrument such that the resulting sound forms a chord.

A further advantage of the present invention is that it provides a drumstick that is adapted for enabling simultaneously activating a plurality of percussion surfaces of a percussion music instrument such that different sound combinations can be created.

A further advantage of the present invention is that it provides a drumstick that comprises a plurality of striking elements disposed along a shaft thereof for enabling simultaneously activating a plurality of percussion surfaces of a percussion music instrument.

A further advantage of the present invention is that it provides a device for touching a touch sensitive surface that is adapted for simultaneously touching the touch sensitive surface at a plurality of locations with each location being associated with a predetermined unique event.

BRIEF DESCRIPTION OF THE DRAWINGS

A preferred embodiment of the present invention is described below with reference to the accompanying drawings, in which.

DESCRIPTION OF THE PREFERRED EMBODIMENT

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While the description of the preferred embodiments hereinbelow is with reference to activating a plurality of percussion surfaces of a MalletKAT percussion instrument, it will become evident to those skilled in the art that the embodiments of the invention are not limited thereto, but are also adaptable for activating a plurality of percussion surfaces of various other percussion music instruments having a plurality of percussion surfaces such as, for example, marimba, xylophone, vibraphone, as well as percussion music instruments having a percussion surface capable of creating different sounds depending on an activating location thereof such as, for example, Cajon. Furthermore, the embodiments of the invention may also be adapted for simultaneously activating a plurality of electronic control surfaces of electronic controllers for generating sound or other events such as, for example, light events.

Figure 1:
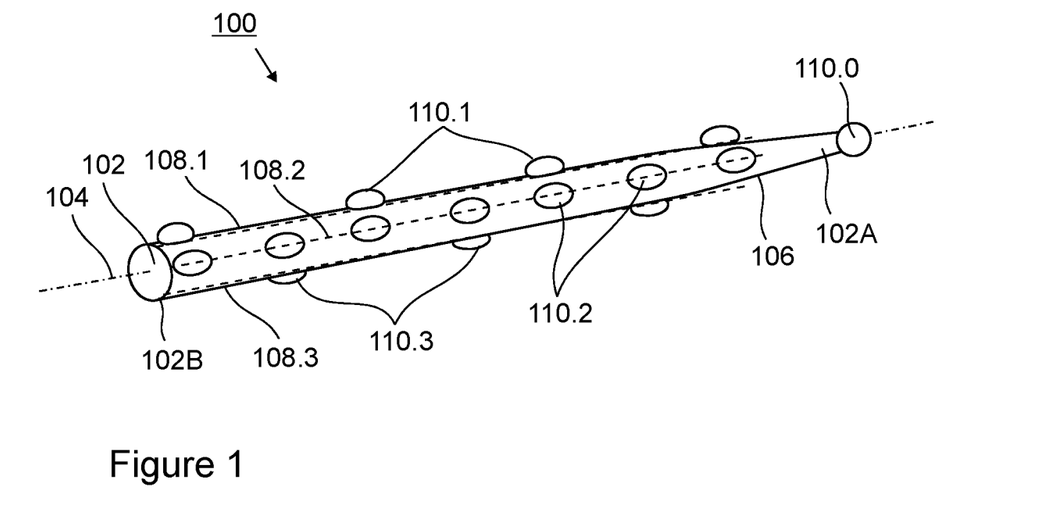
FIGS. 1 and 2 are simplified block diagrams illustrating in a side perspective view and a rear view, respectively, a drumstick according to a preferred embodiment of the invention.
Figure 2:
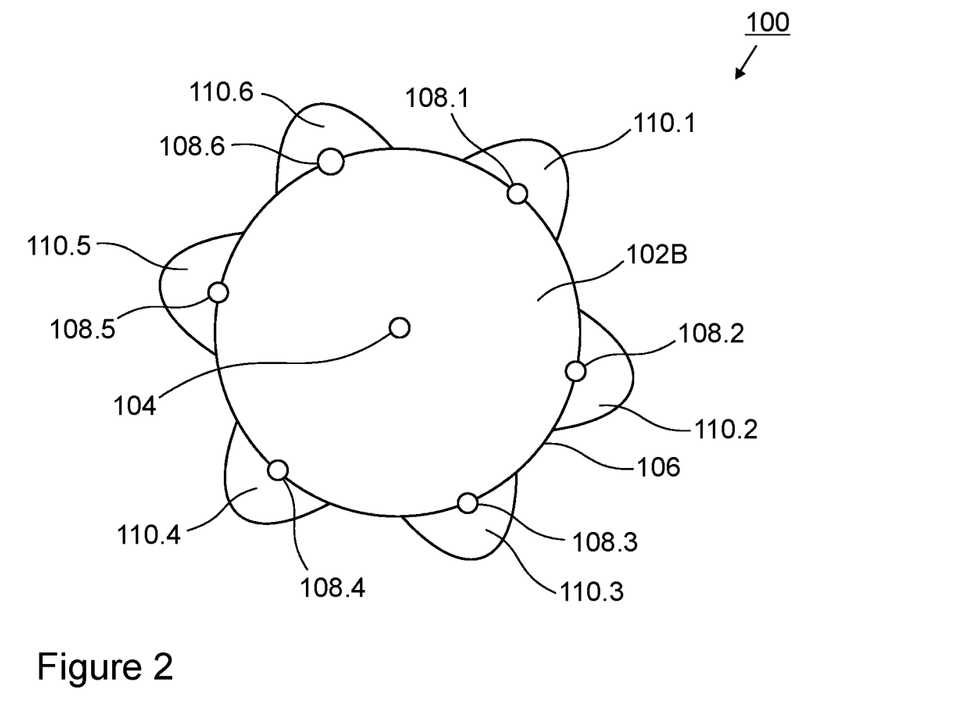
Figure 3:
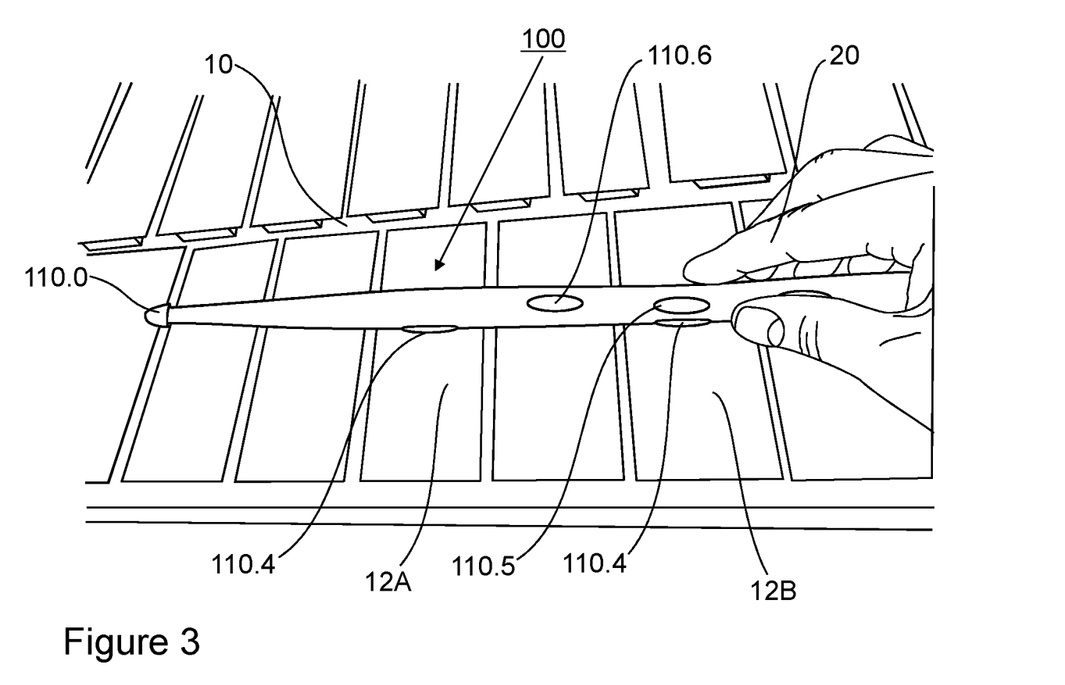
FIGS. 3 and 4 are simplified block diagrams illustrating in a top perspective view and a side view, respectively, the drumstick according to a preferred embodiment of the invention, with the drumstick interacting with respective percussion surfaces during play.
Figure 4:
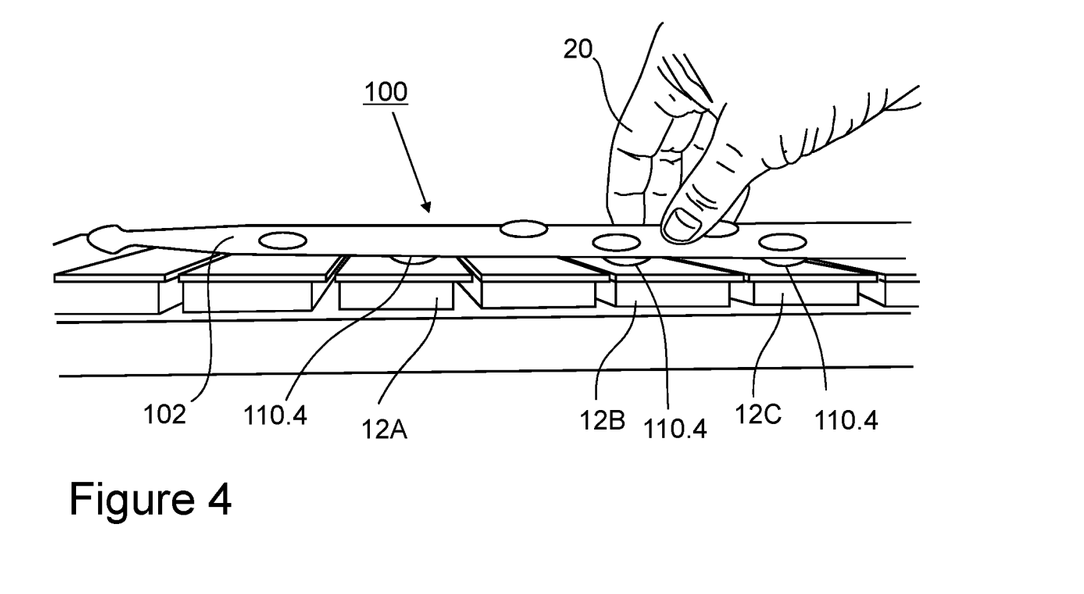

Referring to FIGS. 1 to 9, a drumstick 100, adapted for enabling simultaneously activating a plurality of percussion surfaces of a percussion music instrument, according to a preferred embodiment of the invention is provided. The drumstick comprises a shaft 102 having a plurality of activating elements 110 disposed there along between a shoulder portion 102A and a rear end 102B thereof. The activating elements 110 protrude a surface 106 of the shaft 102 having a predetermined height H, as will be described herein below. The activating elements 110 are adapted for initiating generation of sound associated with simultaneously activating a plurality of percussion surfaces 12A, 12B, 12C, . . . of a percussion music instrument 10, as illustrated in FIGS. 3 and 4.

The activating elements 110 are placed such that they enable the initiation of the generation of sound associated with the activating of different combinations of the percussion surfaces 12A, 12B, 12C, . . . . The activating elements 110 associated with a same combination of the percussion surfaces 12A, 12B, 12C, . . . are disposed along a line 108 oriented parallel to a longitudinal axis 104 of the shaft 102. For example, six different combinations, indicated by the numbering 0.1, 0.2, to 0.6, are realized by disposing the six lines 108.1 to 108.6 with the respective activating elements 110.1 to 110.6 on the surface 106 around the longitudinal axis 104 of the shaft 102, as illustrated in FIGS. 1 and 2. Different combinations can then easily and quickly be played using one hand by simply rotating the drumstick 100 about the longitudinal axis 104 during non-activating play such that the desired activating elements 110 associated with the desired combination of the percussion surfaces 12A, 12B, 12C, . . . is facing downward for activating the percussion surfaces 12A, 12B, 12C, . . . by holding the drumstick 100 with the player's hand 20 and moving the drumstick 100 downward toward the percussion surfaces 12A, 12B, 12C, . . . until the drumstick 100 is abutted by the same, as illustrated in FIGS. 3 and 4 for the combination indicated by the numbering 0.4. Alternatively, the drumstick 100 may be rotated while in contact with the percussion surfaces, i.e. rolled thereon.

As is evident to one skilled in the art, the drum stick 100 is adaptable for realizing simultaneously activating of various different combinations of—typically, 2 to 4—percussion surfaces 12A, 12B, 12C, . . . for generating various sounds associated therewith such as, for example, different chords.

Preferably, activating element 110.0 is placed at the front end of the shoulder portion 102A of the shaft 102, enabling use of the drumstick 100 for activating a single percussion surface 12 in a conventional manner.

Further preferably, the drumstick 100 is provided having similar shapes and sizes as conventional drumsticks, but with the activating elements 110 disposed along the shaft 102 between the shoulder portion 102A and the rear end 102B thereof. The activating elements 110 protrude the surface 106 of the shaft 102 having a height H of, for example, 6-7 mm.

For example, a first combination of six different combinations is realized by placing the activating elements 110.1 at locations 1, 3, 5, and 8 of 8 possible locations along the line 108.1 for generating sound that is associated with a major chord (with octave) when the drumstick 100 is pressed onto the percussion surfaces 12 length-wise, as illustrated in FIGS. 3 and 4 for a different combination, starting at the percussion surface 12 associated with a middle C of the percussion instrument 10. A second combination is realized by placing the activating elements 110.2 at locations 1, 4, 6, and 8 along the line 108.2. As an example, a player can press the drumstick 100 onto the percussion surfaces 12 with the activating elements 110.1 placed at locations 1, 3, 5, and 8 starting at C=CMaj resulting in sound associated with CMaj. The player then rotates the drumstick 100 with the fingers 60° about the longitudinal axis 104 and presses the drumstick 100 with the activating elements 110.2 placed at locations 1, 4, 6, and 8 onto the respective percussion surfaces 12 resulting in sound associated with FMaj.

By turning the drumstick 100 in the hand or rolling the same on the percussion surfaces 12, the player can easily and quickly move to a different chord/voicing, thus enabling a player to generate novel sound effects on existing percussion instruments. Furthermore, in case the percussion surfaces 12 for playing accidental notes are in a same plane as the percussion surfaces 12 for playing the notes of a scale or mode, such as the accidental notes of, for example, the MalletKAT, the drumstick 100 may be employed for playing accidental notes as well as chords based on modes.

Figure 5:
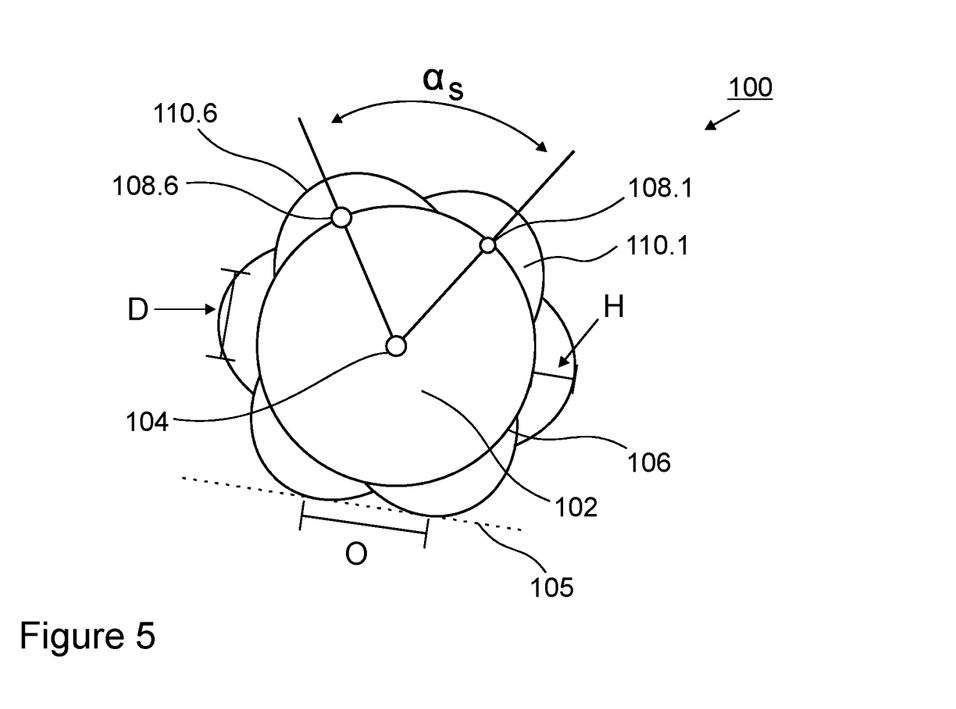
FIGS. 5 and 6 are simplified block diagrams illustrating in cross-sectional views different shapes of the activating elements of the drumstick according to a preferred embodiment of the invention.
Figure 6:
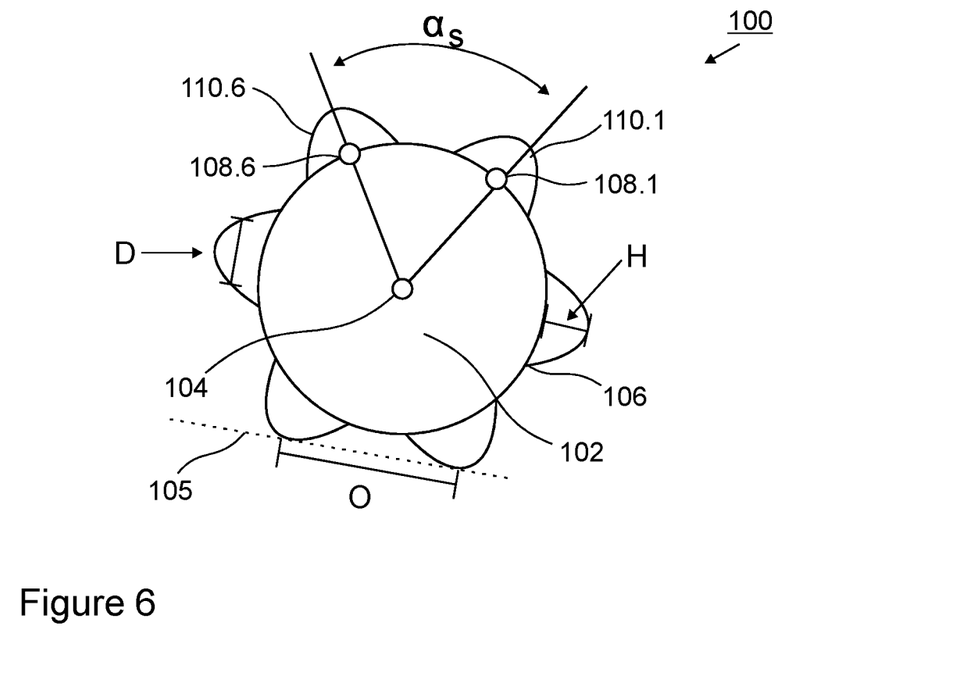

FIGS. 5 and 6 illustrate a cross-section of the drumstick 100 adapted for playing six different combinations with the lines 108 and activating elements 110 being separated equidistant with a separation angle αS of 60°. H indicates the height the activating element 110 extends from the surface 106 of the shaft 102, measured at the activating element's 110 highest point. Duration D represents the slope of the activating element's 110 curve or, alternatively, the surface-area of the activating element 110 in contact with the percussion surface 12, i.e. the duration D determines the amount of surface contact through which pressure is transferred from the drumstick 100 to the percussion surfaces 12. In FIGS. 5 and 6 the separation angle αS and the height H are the same while the duration D in FIG. 6 is shorter than the duration D in FIG. 5. Changing the duration D creates differences in the resulting sound. For example, the shorter duration D in FIG. 6 creates space between the activating elements 110 which ensures that only the combination of notes intended to be played are sounded. A longer duration D leads to unintended notes to be sounded. The dashed line 105 demonstrates an additional measurement, called overlap O. There is an optimal overlap O that provides best performance. The overlap depends on the duration D, the separation angle αS, and the height H. The overlap O affects the performance of the drumstick 100 when pressed onto the percussion surfaces 12, as well as when the drumstick 100 is rolled on the percussion surfaces 12.

In order for the activating elements 110 disposed along the length of the shaft 102 to evenly exert pressure along the length of the shaft 102 it is desirable for the same to be substantially straight. It has been found that slightly flexible but substantially straight shafts 102 work well.

Figure 7:
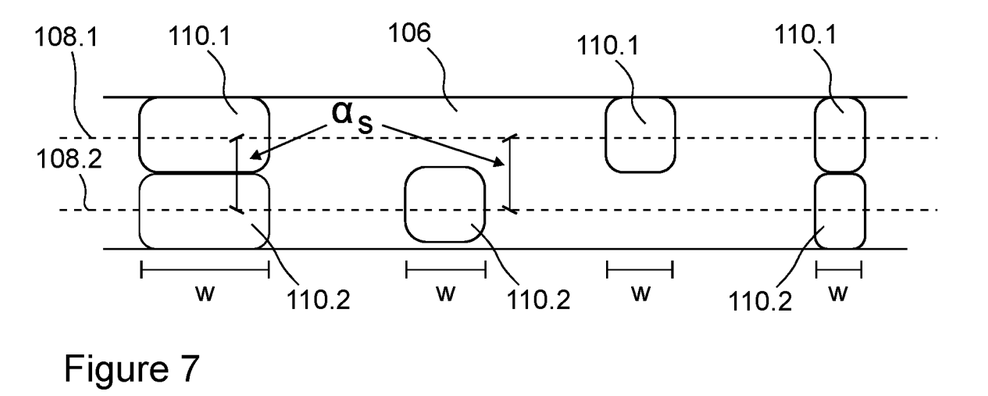
FIG. 7 is a simplified block diagram illustrating in a sectional view different sizes of the activating elements of the drumstick according to a preferred embodiment of the invention.
Figure 8:
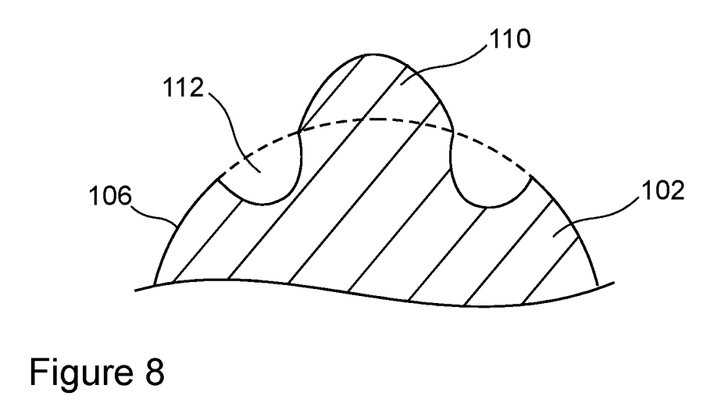
FIG. 8 is a simplified block diagram illustrating in a sectional view provision of a depression in proximity of an activating element of the drumstick according to a preferred embodiment of the invention.

Width W is the distance the activating element 110 extends along the length of the shaft 102, as illustrated in FIG. 7. The MalletKAT responds accurately to a variety of smaller widths W, for example, in a range of 6-7 mm, as long as the combination of width W and duration D provides sufficient surface area on the respective percussion surface 12 of the MalletKAT for the activating element 110 to provide sufficient pressure thereon without triggering notes from adjacent activating elements 110 or the surface 106 of the shaft 102 making contact with the percussion surfaces 12, triggering random notes.

Variation of W, D, and distance between activating elements 110 enables adaptation of the drumstick 100 for use with various types of percussion instruments, electronic percussion instruments, and electronic controllers.

The height H, Duration D, separation angle αS, overlap O, and width W determine the performance of the drumstick 100. For example, a short duration D requires a greater height H if width W is insufficient. The separation angle αS affects both duration D and height H, with decreasing separation angle αS height H increases and duration D decreases. Based on the pressure required to express the desired notes without triggering any undesired notes of the percussion instrument 10, the above design parameters of the drumstick 100 can be determined using standard technologies in the art.

As is evident to those skilled in the art, the drumstick 100, can be designed to provide different numbers of combinations, as well as numerous different combinations of notes to be played simultaneously depending, for example, on the music genre (jazz, rock, etc.). Furthermore, the separation angle αS between different lines 108 of the drumstick 100 may be different, as well as the activating elements 110 may be placed along the line 108 in a non-equidistant fashion. Yet further, one or more of the activating elements 110 placed along the line 108 may have a different height H, resulting in provision of different pressure to different percussion surfaces 12, thus enabling slight changes in the timing of activating the respective percussion surface 12, as well as the characteristic of the generated sound associated with the activated percussion surface 12 such as, for example, the volume.

Optionally, selection of the desired combination is facilitated by providing markers such as, for example, different colours or textures with each colour or texture being associated with a respective combination, disposed on the surface 106 of the shaft 102.

The drumstick 100 is manufactured, for example, from a single piece of wood such as hickory, maple, or oak using a conventional 4-axes CNC lathe. Use of a 4-axes CNC lathe enables quick changes in the production to accommodate manufacturing of small batches or even custom manufacturing of a drumstick 100 with a player's specific note combinations. Alternatively, the drumstick 100 may be manufactured using metal, carbon fiber, or other materials used for manufacturing drumsticks.

Optionally, in order to balance the drumstick 100, a depression 112 is provided in close proximity to the activating element 110 and, for example, surrounding the same. The depression 112 compensates the weight of the material disposed above the surface 106 of the shaft 102, as indicated by the dashed line in FIG. 8.

Figure 9:
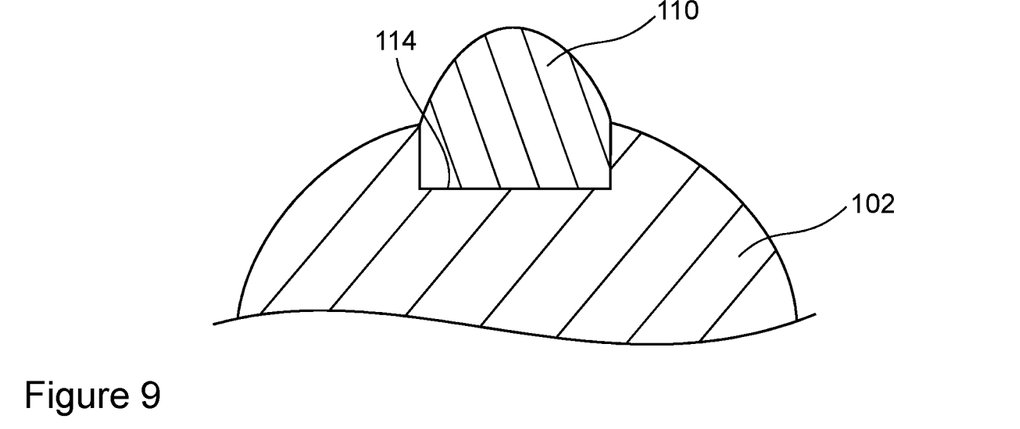
FIG. 9 is a simplified block diagram illustrating in a sectional view a activating element mounted to the shaft of the drumstick according to a preferred embodiment of the invention; and, FIGS. 10 and 11 are simplified block diagrams illustrating in a side view and a sectional view, respectively, a drumstick according to another preferred embodiment of the invention.

Referring to FIG. 9, the activating elements 110 are provided as separate members with a bottom end or bottom portion thereof mounted to the shaft 102 using, for example, an adhesive. For, example, a bottom portion of the activating element 110 is inserted into a respective cavity 114 disposed in the shaft 102. If the activating element 110 is made of a material having a lower density than the material of the shaft 102, the additional weight of the activating element 110 may be compensated by adjusting the depth and/or width of the cavity 114. Optionally, different materials such as, for example, metal, rubber, nylon, may be employed to alter the timbre of the notes played.

Currently, there are numerous software applications available that enable playing a music instrument on a virtual user interacting surface of a music instrument displayed on a touch sensitive surface of, for example, a smart phone, a tablet computer, or a multi-touch controller, such as, for example, App Store MiniPiano, Roland's ZenBeats, and Sensel's Morph.

The drumstick 100 is easily adapted for touching the touch sensitive surface of, for example, a smart phone, a tablet computer, or a multi-touch controller, displaying the user interacting surface of a music instrument thereon by varying the dimensions of the shaft 102 together with the locations and dimensions of the activating elements 110 to be compatible with the size of the respective touch sensitive surface. It is noted that numerous commercially available software applications allow some size adjustments of the displayed music instrument. This enables use of the drumstick 100 for performing the same tasks as described hereinabove, replacing the physical user interacting surface of a music instrument with a virtual one displayed on the touch sensitive surface. Furthermore, it also enables playing music instruments displayed on the touch sensitive surface other than percussion instruments such as, for example, keyboard instruments. Furthermore, the drumstick 100 may also be used for initiating events other than sound by, for example, initiating light events with locations displayed on the touch sensitive surface corresponding to light having different colour and/or intensity.

In particular, the plurality of activating elements 110 disposed along the shaft 102 are adapted for simultaneously touching the touch sensitive surface at a plurality of locations. Each location is associated with a predetermined unique event for generating an event combination associated with the simultaneous initiation of the events associated with the plurality of locations. For example, the activating elements 110 are placed such that they enable the initiation of the generation of sound associated with the simultaneous initiation of the events. The shaft 102 and the activating elements 110 are adapted for touching the touch sensitive surface at the plurality of locations with the locations corresponding to locations on a user interacting surface of a music instrument displayed on the touch sensitive surface. Alternatively, the touch sensitive surface may display the locations in a manner other than the user interacting surface of a music instrument such as, for example, an imaginary display for entertaining children.

Figure 10:
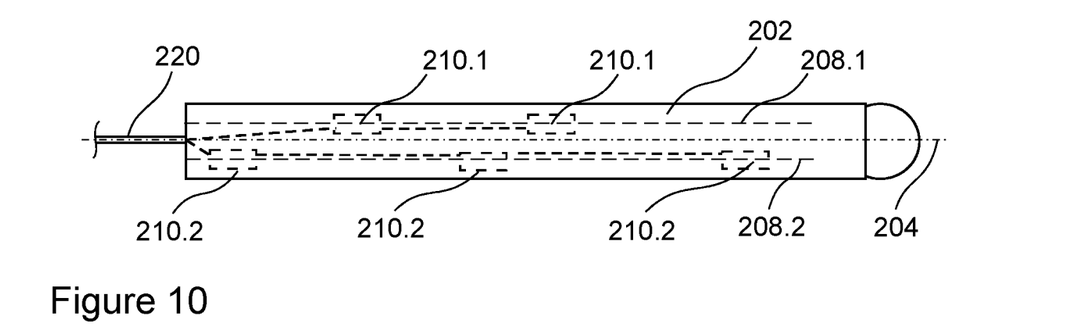
Figure 11:
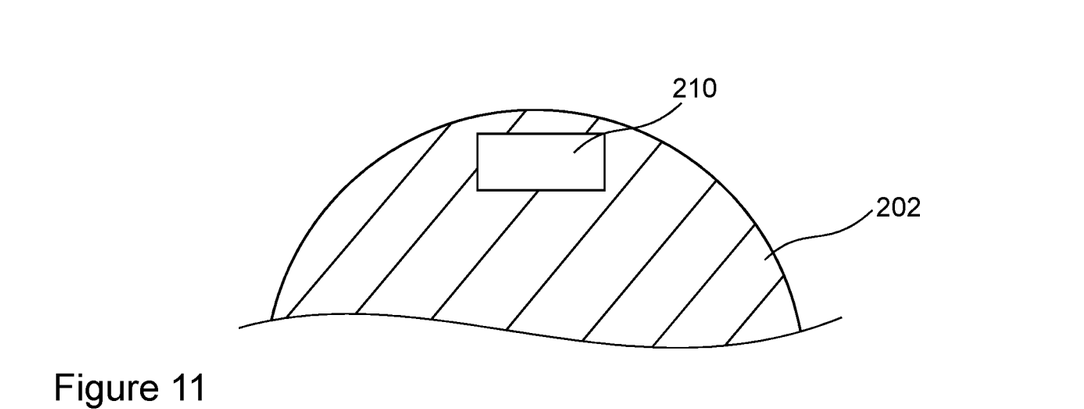

Referring to FIGS. 10 and 11, an electronic drumstick 200 according to another preferred embodiment of the invention is provided. Here, the sound initiating elements are provided as accelerometers 210 disposed in the shaft 202, instead of the activating elements 110. Preferably, the accelerometers 210 are disposed in a similar fashion as the activating elements 110 herein above. For example, a plurality of combinations is realized by placing:

accelerometers 210.1 for triggering a first combination of notes along line 208.1 oriented parallel to longitudinal axis 204 of the shaft 202; accelerometers 210.2 for triggering a second combination of notes are placed along line 208.2; etc. The accelerometers 210 are connected via cable 220 to, for example, a Musical Instrument Digital Interface (MIDI) controller for generating the sound associated with the selected combination of notes 0.1, 0.2, etc. During playing, the electronic drumstick 200 is used, for example, in a similar fashion as the drumstick 100 with any surface, or even absent any surface.

The present invention has been described herein with regard to preferred embodiments. However, it will be obvious to persons skilled in the art that a number of variations and modifications can be made without departing from the scope of the invention as described herein.

What is claimed is:

1. A drumstick comprising:
a shaft having a longitudinal axis;
a plurality of sound initiating elements disposed along the shaft, the plurality of sound initiating elements being disposed at predetermined locations with the predetermined locations being spaced apart from each other such that they correspond to locations of respective predetermined percussion surfaces of a plurality of percussion surfaces, the predetermined percussion surfaces being associated with predetermined combinations of the plurality of percussion surfaces,
wherein
the plurality of sound initiating elements are disposed along respective lines of a plurality of lines on a surface of the shaft with each line of the plurality of lines being parallel to the longitudinal axis of the shaft, with each respective plurality of sound initiating elements along each respective line of the plurality of lines being associated with one of said respective predetermined combinations of the plurality of percussion surfaces.

2. The drumstick according to claim 1, wherein the plurality of sound initiating elements are placed such that they enable the initiation of the generation of sound associated with the activating of different combinations of the respective plurality of percussion surfaces.

3. The drumstick according to claim 1, wherein the plurality of sound initiating elements associated with different combinations of the respective plurality of percussion surfaces are disposed around the longitudinal axis of the shaft.

4. The drumstick according to claim 1, wherein the plurality of sound initiating elements comprise a plurality of activating elements protruding from the shaft such that they simultaneously contact the respective plurality of percussion surfaces for initiating the generation of a respective plurality of sounds.

5. The drumstick according to claim 4, wherein the plurality of activating elements are disposed on the shaft such that the resulting sound forms a chord.

6. The drumstick according to claim 4, wherein each of the plurality of activating elements is surrounded by a depression.

7. The drumstick according to claim 1, wherein the plurality of sound initiating elements comprise accelerometers disposed in the shaft.

8. A device for touching a touch sensitive surface comprising:
- a shaft having a longitudinal axis;
- a plurality of activating elements disposed along the shaft, the plurality of activating elements being disposed at predetermined locations with the predetermined locations being spaced apart from each other such that they correspond to locations of respective predetermined event initiating surfaces of a plurality of event initiating surfaces, the predetermined event initiating surfaces being associated with predetermined combinations of the plurality of event initiating surfaces, wherein the plurality of activating elements are disposed along respective lines of a plurality of lines on a surface of the shaft with each line of the plurality of lines being parallel to a longitudinal axis of the shaft, with the plurality of activating elements along each respective line of the plurality of lines being associated with one of said respective predetermined combinations of the plurality of events.

9. The device according to claim 8, wherein the plurality of activating elements are placed such that they enable the initiation of the generation of sound associated with the simultaneous initiation of the respective plurality of events.

10. The device according to claim 9, wherein said plurality of predetermined locations comprise a plurality of touch sensitive surfaces, and wherein the shaft and the plurality of activating elements are adapted for touching one or more of the respective plurality of touch sensitive surfaces at one or more of the respective plurality of predetermined locations with the respective plurality of predetermined locations corresponding to respective locations on a user interacting surface of a music instrument displayed on the plurality of touch sensitive surfaces.

* * * * *